(12) United States Patent
Tuzi et al.

(10) Patent No.: US 11,188,847 B2
(45) Date of Patent: Nov. 30, 2021

(54) PRE-TRAINING OF A REINFORCEMENT LEARNING GROUND VEHICLE CONTROLLER USING MONTE CARLO SIMULATION

(71) Applicant: Traxen Inc., Plymouth, MI (US)

(72) Inventors: Gerti Tuzi, Plymouth, MI (US); Saeed Zamanzad Gavidel, Plymouth, MI (US); Syed Ali, Plymouth, MI (US); Ali Maleki, Plymouth, MI (US)

(73) Assignee: Traxen Inc., Plymouth, MI (US)

( * ) Notice: Subject to any disclaimer, the term of this patent is extended or adjusted under 35 U.S.C. 154(b) by 216 days.

(21) Appl. No.: 16/438,337

(22) Filed: Jun. 11, 2019

(65) Prior Publication Data
US 2019/0378042 A1 Dec. 12, 2019

Related U.S. Application Data

(63) Continuation of application No. 16/355,657, filed on Mar. 15, 2019, and a continuation of application No. 16/355,641, filed on Mar. 15, 2019, now Pat. No. 11,072,329, and a continuation of application No. 16/289,638, filed on Feb. 28, 2019, now abandoned, and a continuation of application No. 16/289,635, filed on Feb. 28, 2019, now abandoned, and a continuation of application No. 16/212,108, filed on Dec. 6, 2018.

(60) Provisional application No. 62/683,188, filed on Jun. 11, 2018.

(51) Int. Cl.
*G06N 20/00* (2019.01)
*B60W 50/00* (2006.01)
*B60W 30/14* (2006.01)

(52) U.S. Cl.
CPC ............ *G06N 20/00* (2019.01); *B60W 30/14* (2013.01); *B60W 50/0097* (2013.01); *B60W 2050/0013* (2013.01); *B60W 2400/00* (2013.01)

(58) Field of Classification Search
USPC .......................................................... 701/98
See application file for complete search history.

(56) References Cited

U.S. PATENT DOCUMENTS

| | | | |
|---|---|---|---|
| 9,020,726 B2 | 4/2015 | Boeckenhoff et al. | |
| 2007/0087756 A1* | 4/2007 | Hoffberg | G06Q 20/40 455/450 |
| 2012/0010767 A1* | 1/2012 | Phillips | B60W 10/06 701/22 |
| 2015/0298684 A1* | 10/2015 | Schwartz | B60W 20/12 701/22 |
| 2016/0167582 A1* | 6/2016 | Chen | G01C 21/32 348/148 |
| 2018/0072157 A1 | 3/2018 | Koebler et al. | |
| 2018/0089563 A1* | 3/2018 | Redding | G05D 1/0088 |
| 2018/0141544 A1* | 5/2018 | Xiao | B60W 10/18 |
| 2019/0378042 A1* | 12/2019 | Tuzi | B60W 30/14 |

FOREIGN PATENT DOCUMENTS

DE  102016214045  2/2018

* cited by examiner

*Primary Examiner* — Tyler D Paige

(57) ABSTRACT

Techniques for utilizing a Monte Carlo model to perform pre-training of a ground vehicle controller. A sampled distribution of actions and corresponding states can be utilized to train a reinforcement learning controller policy, learn an action-value function, or select a set of control parameters with a predetermined loss.

21 Claims, 7 Drawing Sheets

PRE-TRAINING OF A REINFORCEMENT LEARNING GROUND VEHICLE CONTROLLER USING MONTE CARLO SIMULATION

CROSS-REFERENCE TO RELATED APPLICATIONS

This is a Continuation of U.S. patent application Ser. No. 16/355,657, filed Mar. 15, 2019, a Continuation of U.S. patent application Ser. No. 16/355,641, filed Mar. 15, 2019, a Continuation of U.S. patent application Ser. No. 16/289,638 filed Feb. 28, 2019, a Continuation of U.S. patent application Ser. No. 16/289,635, filed Feb. 28, 2019, a Continuation of U.S. patent application Ser. No. 16/212,108 filed Dec. 6, 2018, and claims the benefit of U.S. Provisional Patent Application No. 62/683,188 filed Jun. 11, 2018, all of which are incorporated herein by reference in their entirety. This application also claims the benefit of co-filed U.S. application Ser. No. 16/438,319, filed Jun. 11, 2019, entitled "Predictive Control Techniques for Ground Vehicles", co-filed U.S. application Ser. No. 16/438,223, filed Jun. 11, 2019, entitled "Normalized Performance Comparison Techniques", co-filed U.S. application Ser. No. 16/438,305, filed Jun. 11, 2019, entitled "User Vehicle Operation interface Systems and Methods", and co-filed PCT Application No. PCT/US19/36634, filed Jun. 11, 2019, entitled "Automated Cruise Control System to Automatically Decrease an Overall Ground Vehicle Energy Consumption", all of which are incorporated herein by reference in their entirety.

BACKGROUND OF THE INVENTION

The operating costs of commercial vehicles include fuel, labor, equipment, insurance and the like. The fuel costs are the largest portion of the operating costs. The profit margin across the commercial truck industry is currently approximately 4.8%. Therefore, if operating costs, through fuel savings, can be reduced by just 5%, the net operating profit margins for a trucking company can be increased by 50%.

Generally, optimal energy efficiency can be obtained while cruising at a steady speed, at minimal throttle and with the transmission in the highest gear on a level roadway. However, the driving environment is highly dynamic and therefore ground vehicles cannot be operated at a steady state cruising speed, with minimal throttle input in the highest gear. Hills, curves, traffic, weather and the like will require the vehicle to operate at varying speeds, accelerating and braking, and changing between multiple gears. The driving environment and the skill of the given driver can have a significant impact on energy efficiency. Different drivers will also operate ground vehicles at different speeds, have different acceleration and braking patterns, and use different gears at different times. For example, two different drivers may operate substantially identical vehicles and maneuver along identical routes during identical traffic conditions. The first driver may operate the ground vehicle differently from the second driver. The first driver may, for example, apply the brakes significantly less than the second driver by coasting toward upcoming stops, in comparison to the second driver who may continue to drive toward the stop and abruptly apply the brakes upon reaching the stop. The different driving styles of the drivers can result in different overall energy utilization for the same trips.

Conventional, cruise control and adaptive cruise control systems can provide some increases in fuel economy. The cruise control and adaptive cruise control systems allow the driver to set the speed of the ground vehicle. Adaptive cruise control systems can also automatically adjust the vehicle speed by gradually braking and accelerating such that the ground vehicle maintains a specified distance from an impeding ground vehicle while operating at the set speed as much as possible. The set speed and controlled acceleration and braking of cruise control and adaptive cruise control systems typically provides some improved fuel efficiency in comparison to manual operation by the second type of driver. However, the driving style of the first driver may provide better energy efficiency than the cruise control and adaptive cruise control systems. Therefore, there is a continuing need for further energy economy techniques.

SUMMARY OF THE INVENTION

The present technology may best be understood by referring to the following description and accompanying drawings that are used to illustrate embodiments of the present technology directed toward Monte Carlo based training of a ground vehicle controller.

In one embodiment, a method of training can include receiving a stochastic Monte Carlo model of a set of ground vehicle drivers. Training data can be generated by sampling actions for given states of the stochastic Monte Carlo model in a simulated ground vehicle environment and collecting traces of sequences of states, actions and rewards. The training data including the collected traces of sequences of states, actions, and rewards can be used in pre-training to learn a stochastic action-value function for expected discounted future returns. A reinforcement learning controller can then be trained using the stochastic action-value function.

In another embodiment, a method of training can include generating training data by sampling actions for given states of the stochastic Monte Carlo model in a simulated ground vehicle environment and collecting traces of sequences of states and probabilities of action. The training data including the collected traces of sequences of states and probability of action can be used in pre-training to generate a stochastic policy. A reinforcement learning controller can be trained using the stochastic policy.

In another embodiment, a method of training can include Monte Carlo sampling a set of parameter from a model-parameter distribution in a first loop. In a second loop within the first loop, simulation can be performed by an offline controller parameterized for the set of sampled parameters using a vehicle model and a sequence of states of a local environment. In the second loop, samples of losses for the simulations using the vehicle model and the sequence of states of the local environment can be determined until a stopping criterion is satisfied. After the stopping criterion is satisfied, a given control parameter that yields a predetermined loss can be selected. A control parameter of an online controller can be set based on the selected control parameter that yielded the predetermined loss.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Embodiments of the present technology are illustrated by way of example and not by way of limitation, in the figures of the accompanying drawings and in which like reference numerals refer to similar elements and in which.

DETAILED DESCRIPTION OF THE INVENTION

Figure 1:
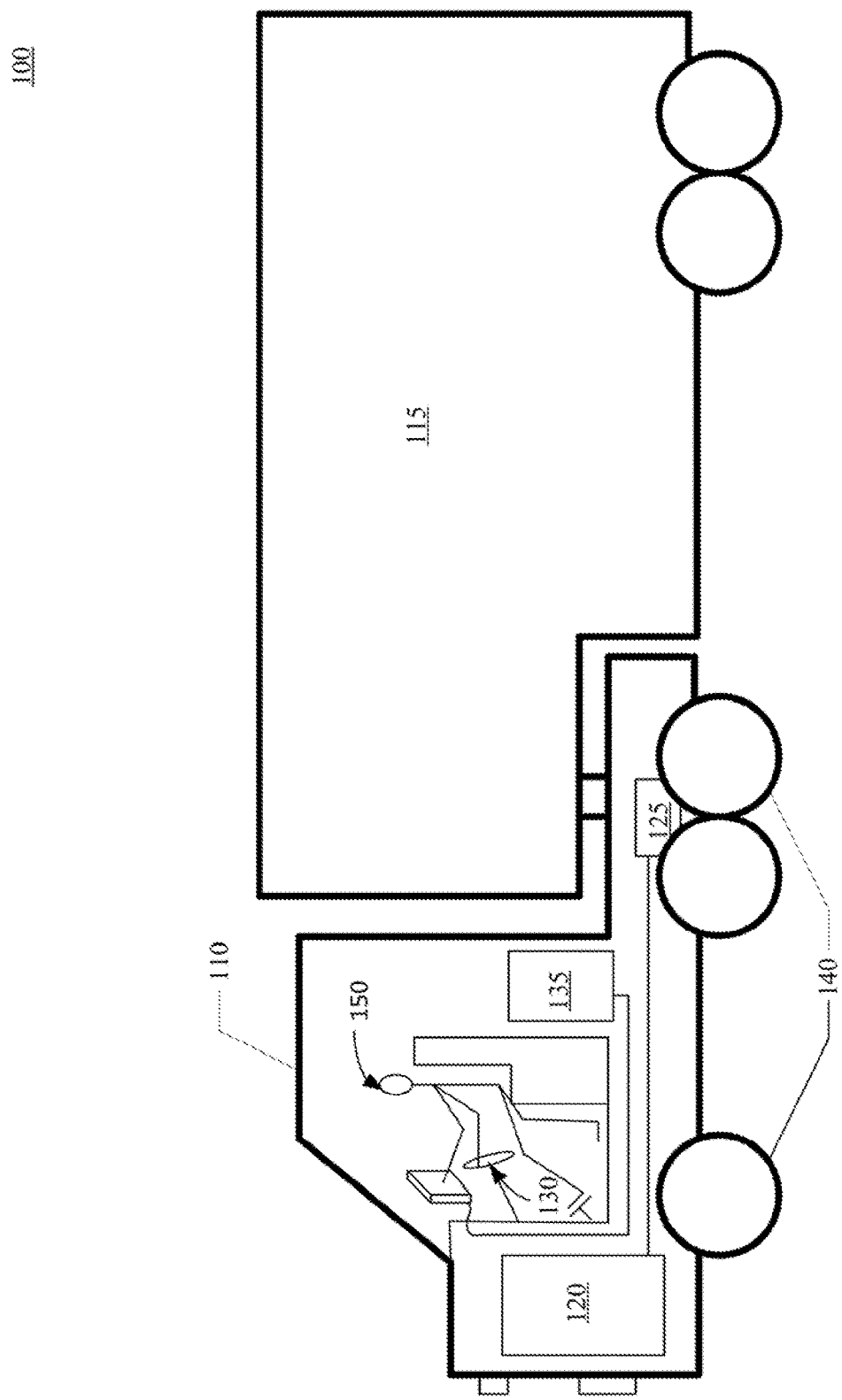
FIG. 1 shows an exemplary ground vehicle, in accordance with aspects of the present technology.

Reference will now be made in detail to the embodiments of the present technology, examples of which are illustrated in the accompanying drawings. While the present technology will be described in conjunction with these embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of the present technology, numerous specific details are set forth in order to provide a thorough understanding of the present technology. However, it is understood that the present technology may be practiced without these specific details. In other instances, well-known methods, procedures, components, and circuits have not been described in detail as not to unnecessarily obscure aspects of the present technology.

Some embodiments of the present technology which follow are presented in terms of routines, modules, logic blocks, and other symbolic representations of operations on data within one or more electronic devices. The descriptions and representations are the means used by those skilled in the art to most effectively convey the substance of their work to others skilled in the art. A routine, module, logic block and/or the like, is herein, and generally, conceived to be a self-consistent sequence of processes or instructions leading to a desired result. The processes are those including physical manipulations of physical quantities. Usually, though not necessarily, these physical manipulations take the form of electric or magnetic signals capable of being stored, transferred, compared and otherwise manipulated in an electronic device. For reasons of convenience, and with reference to common usage, these signals are referred to as data, bits, values, elements, symbols, characters, terms, numbers, strings, and/or the like with reference to embodiments of the present technology.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussion, it is understood that through discussions of the present technology, discussions utilizing the terms such as "receiving," and/or the like, refer to the actions and processes of an electronic device such as an electronic computing device that manipulates and transforms data. The data is represented as physical (e.g., electronic) quantities within the electronic device's logic circuits, registers, memories and/or the like, and is transformed into other data similarly represented as physical quantities within the electronic device.

In this application, the use of the disjunctive is intended to include the conjunctive. The use of definite or indefinite articles is not intended to indicate cardinality. In particular, a reference to "the" object or "a" object is intended to denote also one of a possible plurality of such objects. It is also to be understood that the phraseology and terminology used herein is for the purpose of description and should not be regarded as limiting.

As used herein, a ground vehicle includes a motorized vehicle with wheels that maneuvers along roadways. For example, ground vehicles can include, but are not limited to, semi-trucks, tractor-trailers, trucks, busses, motorhomes, automobiles, cars, motor cycles, recreational vehicles (RVs), all-terrain vehicles (ATVs), utility vehicles (UTVs), tractors and the like. As used herein, the term energy can include, but is not limited to, gasoline, diesel, propane, natural gas, ethanol, alcohol, electricity, solar, battery, hydrogen, and the like. As used herein, engines can include, but are not limited to, internal combustion engines, electric motors, and the like. As used herein, the term powertrain includes the mechanisms by which power is generated and transmitted to the roadway by the ground vehicle. As used herein, the term performance can include, but is not limited to, energy consumption, braking, shifting, travel time, travel distance, and or the like.

Referring to FIG. 1, an exemplary ground vehicle, in accordance with aspects of the present technology, is shown. The ground vehicle 100 can include one or more vehicle bodies 110, 115, one or more engines 120, one or more transmissions 125, one or more braking system, a steering system 130, one or more operation expert systems 135, one or more sensors, one or more controllers, one or more communication interfaces, a set of wheels 140, and the like. The ground vehicle 100 can, for example, be a tractor trailer. The ground vehicle 100 can include, for example, an internal combustion engine, an electric motor or a combination of an internal combustion and an electric motor. The one or more engines can create propulsion drive for the vehicle. The one or more transmissions 125 can transmit the propulsion drive from the one or more engines to one or more wheels. The one or more operation expert systems 135 can receive information from various components of the ground vehicle and can perform various analysis with regard to the operation of the ground vehicle. The one or more operation expert systems 135 can include an energy consumption cruise controller, a predictive enhanced cruise controller, and or the like.

Figure 2:
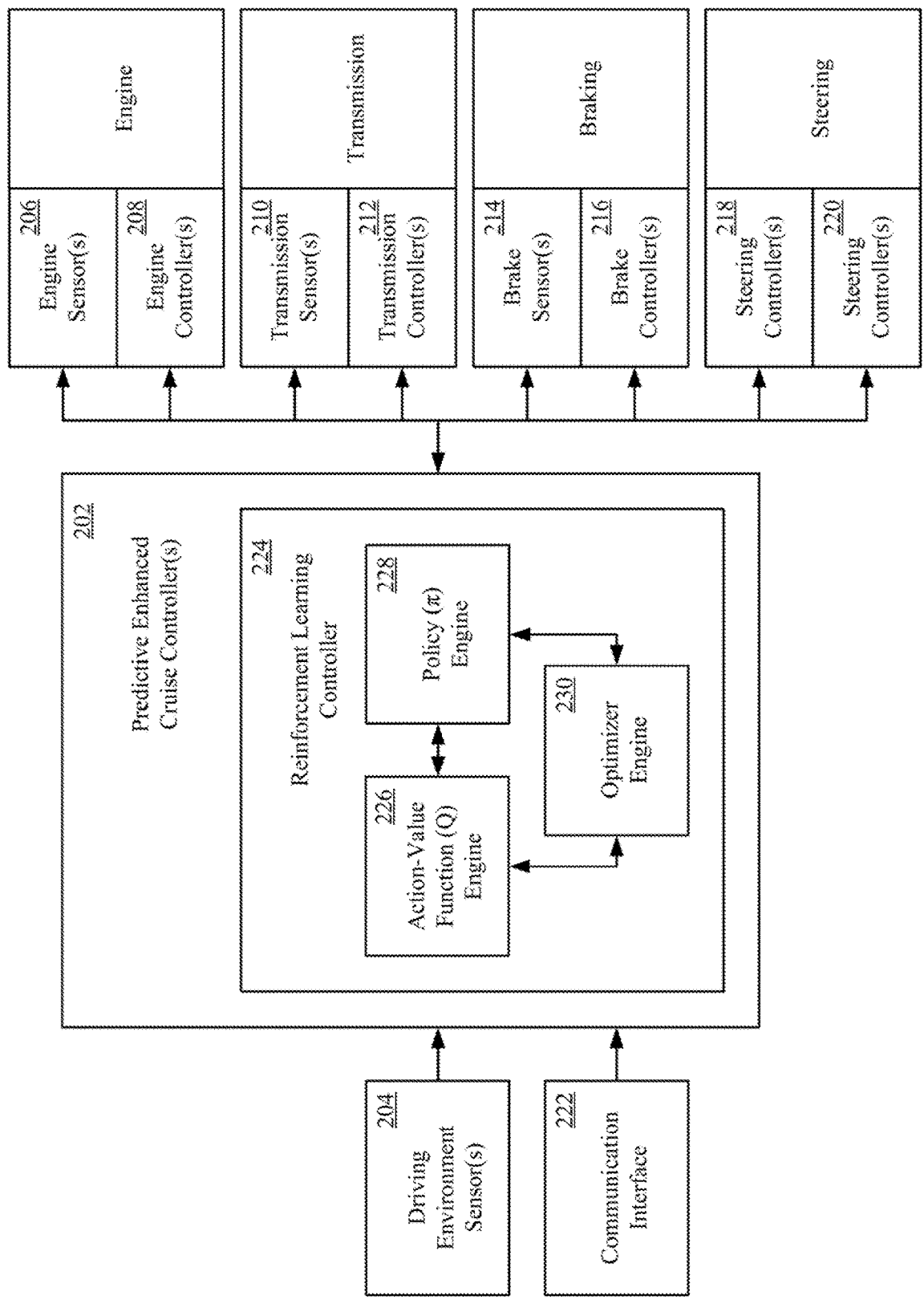
FIG. 2 shows a predictive enhanced cruise controller for use in a ground vehicle, in accordance with aspects of the present technology.

Referring now to FIG. 2, a predictive enhanced cruise controller for use in a ground vehicle, in accordance with aspects of the present technology, is shown. The predictive enhanced cruise controller 202 can be communicatively coupled to one or more driving environment sensors 204, one or more engine sensors 206 and or one or more engine controllers 208. The predictive enhanced controller 202 can also be communicatively coupled to one or more transmission sensors 210, one or more transmission controllers 212, one or more brake sensors 214, one or more brake controllers 216, one or more steering sensors 218, one or more steering controllers 220, and or other similar sensors and controllers. The predictive enhanced cruise controller 202 can also be communicatively coupled to one or more external networks through one or more communication interfaces 222.

In one implementation, the one or more predictive enhanced cruise controllers 202 and one or more of the sensors and controllers can be integral to the ground vehicle. The one or more predictive enhanced cruise controllers 202 can be implemented in hardware, firmware, software or any combination thereof. In other implementation, the one or more predictive enhanced controllers 202 can be implemented in a distributed computing architecture. For example, some functions of the predictive enhanced cruise controller can be implemented as computing device-executable instructions (e.g., computer program) that are stored in computing device-readable media (e.g., computer memory) and executed by a computing device (e.g., processor) on the ground vehicle. One or more other functions can be implemented on one or more other computing devices external to the ground vehicle. The one or more other functions can for example be implement in the cloud, on a remote server, or the like.

The engine sensors 206 and engine controllers 208 can include, but not limited to, Engine Control Modules (ECM), Engine Control Units (ECU), throttle position sensors, fuel injector sensors, intake sensors, mass airflow sensors, oxygen sensors, exhaust sensors, engine tachometers, voltmeters, current meters, temperature sensors, fluid level sensors, and the like. The engine sensors 206 can for example provide ground vehicle operating parameters such as current fuel consumption, engine revolutions per minute (RPMs), and the like. The engine controllers 208 can for example control fuel injection parameters in response to throttle control inputs, and the like. The transmission sensors 210 and transmission controllers 212 can include, but not limited to, shift lever position sensors, gear selection sensors, clutch pedal position sensors, Transmission Control Units (TCU), tachometers, temperature sensors, fluid level sensors, hydraulic controllers, servos, and the like. The transmission sensors 210 can for example provide vehicle operating parameters such as transmission RPM, torque, current gear, and the like. The transmission controllers 212 can for example control clutch and shift inputs and the like. The brake sensors 214 and brake controllers 216 can include, but not limited to, brake pedal position sensors, brake pedal force sensors, hydraulic pressure sensors, air pressure sensors, torque sensors, anti-lock brake system (ABS) controllers, and the like. The steering sensors 218 and steering controllers 220 can include, but not limited to, steering position sensors and the like. The driving environment sensors 204 can include, but not limited to, cameras, radar, inertial measurement units (IMU), global position systems (GPS), light detection and ranging (LIDAR), temperature sensors, dedicated short range communications (DSRC), and the like. The driving environment sensors 204 can for example provide driving environment parameters such as road surface condition, road width, lane markings, traffic control devices, traffic conditions, line of sight, visibility, lighting, current weather, location, and the like. The communication interface 222 can provide for downloading or streaming of two- or three-dimensional map data, current and future weather conditions, traffic conditions, and or the like. Some sensors and controllers can provide and or operate on the same, similar and or overlapping data, functions and the like. In addition, various data and or functions can be combined to increase confidence, increase accuracy, generate additional data, generate higher level functions, and or the like.

Figure 3:
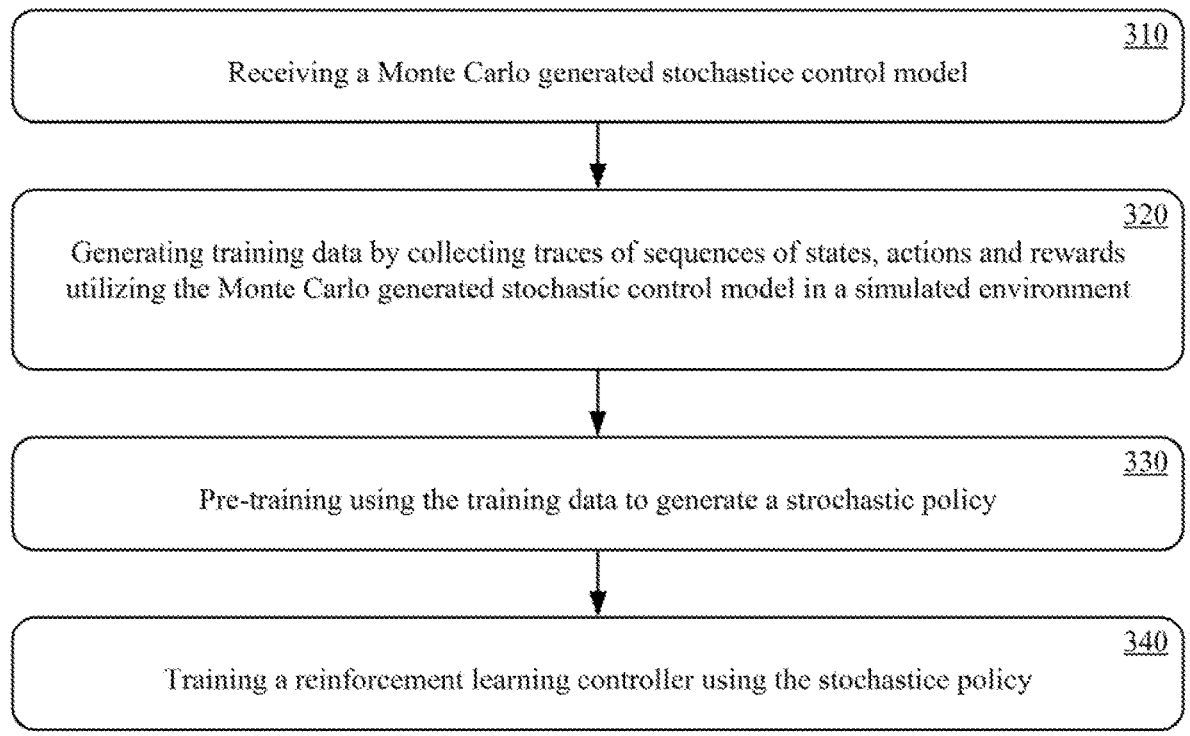
FIG. 3 shows a Monte Carlo base training of a reinforcement leaning controller, in accordance with aspects of the present technology is shown.
Figure 4:
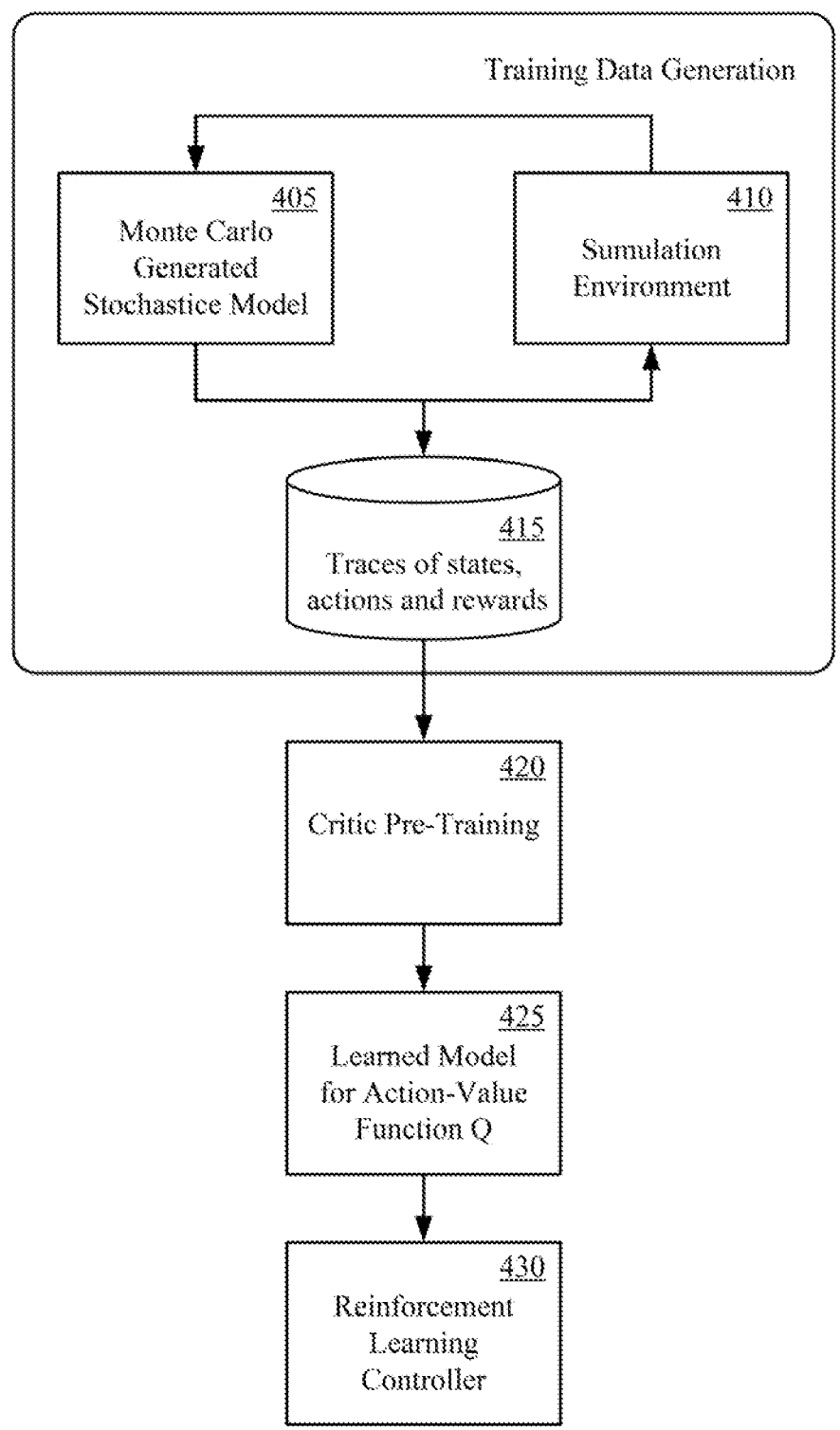
FIG. 4 shows a Monte Carlo base training of a reinforcement leaning controller, in accordance with aspects of the present technology is shown.

Referring now to FIG. 3, a Monte Carlo base training of a reinforcement leaning controller, in accordance with aspects of the present technology, is shown. The Monte Carlo based training of a reinforcement learning controller, will be further explained with reference to FIG. 4. The method can include receiving a Monte Carlo generated stochastic control model, at 310. The Monte Carlo generated stochastic control model 405 can be a fitted or inferred model.

Figure 5:
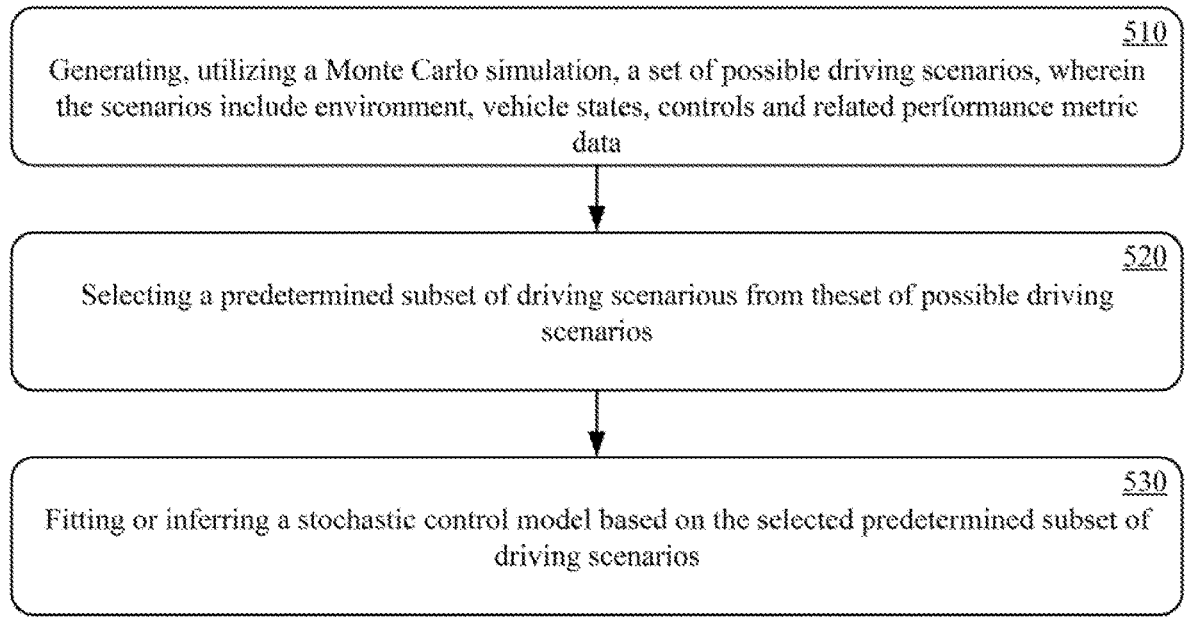
FIG. 5 shows a method of generating a stochastic model utilizing a Monte Carlo simulation paradigm, in accordance with aspects of the present technology.

A method of generating a stochastic model utilizing a Monte Carlo simulation paradigm, in accordance with aspects of the present technology, is shown in FIG. 5. The method can include generating a set of possible driving scenarios utilizing a Monte Carlo simulation, at 510. The driving scenarios can include environment, vehicle state, control and related performance metric data. In one implementation, the set of possible driving scenarios can include all possible driving scenarios generated utilizing the Monte Carlo simulation. The performance metric data can include fuel efficiency, safety or the like. In one implementation, the environment, vehicle state, control and related performance metric data for all possible driving scenarios can be stored in a table. At 520, a predetermined subset of the possible driving scenarios can be selected. For example, scenarios having performance metric values of the upper quartile of fuel-efficient can be selected from the table of data for all the possible driving scenarios. At 530, a stochastic control model can be fitted to or inferred from the environment, vehicle state, control and related performance metric data of the predetermined subset of driving scenarios. In one implementation, a stochastic control model can be fitted to the selected predetermined subset of driving scenarios.

Referring again to FIG. 3 and FIG. 4, the Monte Carlo generated stochastic control model $\Phi(\tilde{a}|s)$ 405 can be utilized in a simulation environment 410 to generate training data 415, at 320. The training data 415 can be generated by sampling actions $\tilde{a}_i$ for given states $s_i$ using the Monte Carlo stochastic control model $\Phi(\tilde{a}|s)$ 405 in the simulated ground vehicle environment 410 and collecting traces of sequences of states, actions, and rewards $\{s_i, \tilde{a}_i, r_i\}_\tau$. In one implementation, the training data 415 comprising the collected traces of sequences of states, action, and rewards $\{s_i, \tilde{a}_i, r_i\}_\tau$ can be stored in a data structure for use in the subsequently described pre-training 420-430.

At 330, pre-training 420 can be performed to generate a learned model for an action-value function Q, parameterized by $\psi$, belonging to a family of action-value functions $\mathcal{K}$, 425 using the training data 415 including the collected traces of sequences of states, actions and rewards $\{s_i, \tilde{a}_i, r_i\}_\tau$. The pre-training can be performed in a supervised learning context. The action-value function Q can be learned for the expected discounted future returns, under an actor-critic reinforcement learning framework. In one implementation, the learned model for the function Q can be optimized as a regression problem in accordance with Equations 1, 2 and 3.

$$R_i = \sum_{t=i}^{T} \gamma^{t-i} \{r_t\}_\tau \qquad (1)$$

$$\hat{R}_i = Q(s_{i,\tau}, \tilde{a}_{i,\tau} \mid \psi^k) \qquad (2)$$

$$\psi^\# = \min_\psi \|\hat{R} - R\|_p \qquad (3)$$

Where the i-th estimated sum of discounted rewards, $R_i \in \mathbb{R}$, over the rewards collected over a given simulation episode $\tau$ of temporal length T using $\Phi$, starting from state $s_{i,\tau}$ to the end of episode $\tau$, is the target to be estimated by the action-value function Q. The optimal function $Q^\#$ in $\mathcal{K}$, parameterized by $\psi^\#$, which best estimates the sum of discounted future rewards over the pre-training samples, is found by minimizing p-norm between the set of the estimations $\hat{R}$ and the corresponding sum of discounted rewards R, generated by following $\Phi(\tilde{a}|s)$ during the training data generation.

At 340, a reinforcement learning controller 430 can be trained using the learned model for an action-value function Q 425. The reinforcement learning controller 430 can be trained during a simulation mode or an operating mode of a ground vehicle. The Monte Carlo process generates data to train stochastic control model $\Phi(\tilde{a}|s)$, which is used to generate off-policy pre-training samples from regions of high reward density, guiding the initial policy search outside of the RL framework thus improving the optimal policy search in a reinforcement learning framework. However, these guiding samples will continue to expose the critic, as well as the actor to samples of high reward density regions. Moreover, adaptations to $\Phi(\tilde{a}|s)$, via variations in the Monte Carlo data generation process can continue to contribute to the reinforcement learning controller via off-policy samples. This approach can thus be used to expose the controller to new or under-represented scenarios.

Adaptations to the stochastic control model $\Phi$ via the Monte Carlo generation process can continue to contribute to the online controller via off-policy samples. Even after the controller has been pretrained and placed the actor+critic in the reinforcement learning framework for a while, a new stochastic control mode $\Phi$ can be generated by Monte Carlo by following some different criterion and used to further guide the online search process. This approach can thus be used to adapt the controller to new driving scenarios. This would be useful in cases where these new driving scenarios have not been experienced by the agent or were under-represented during pre-training and or online reinforcement learning.

Figure 6:
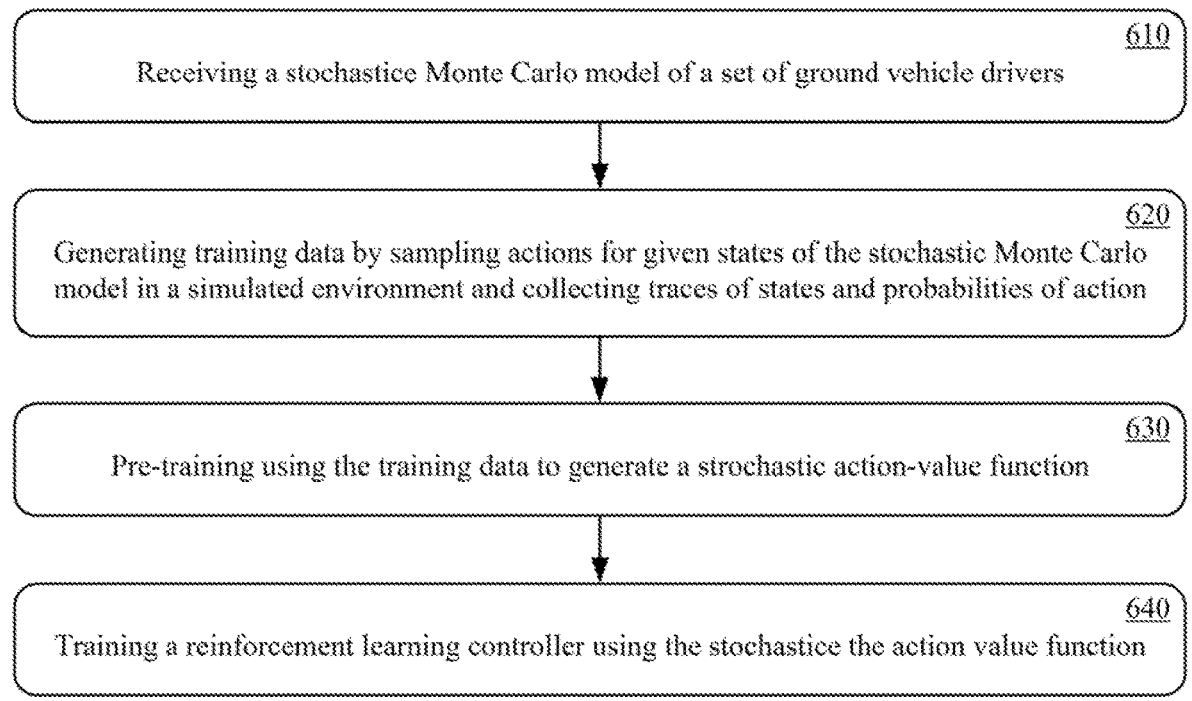
FIG. 6 shows a Monte Carlo base training of a reinforcement leaning controller, in accordance with aspects of the present technology is shown.
Figure 7:
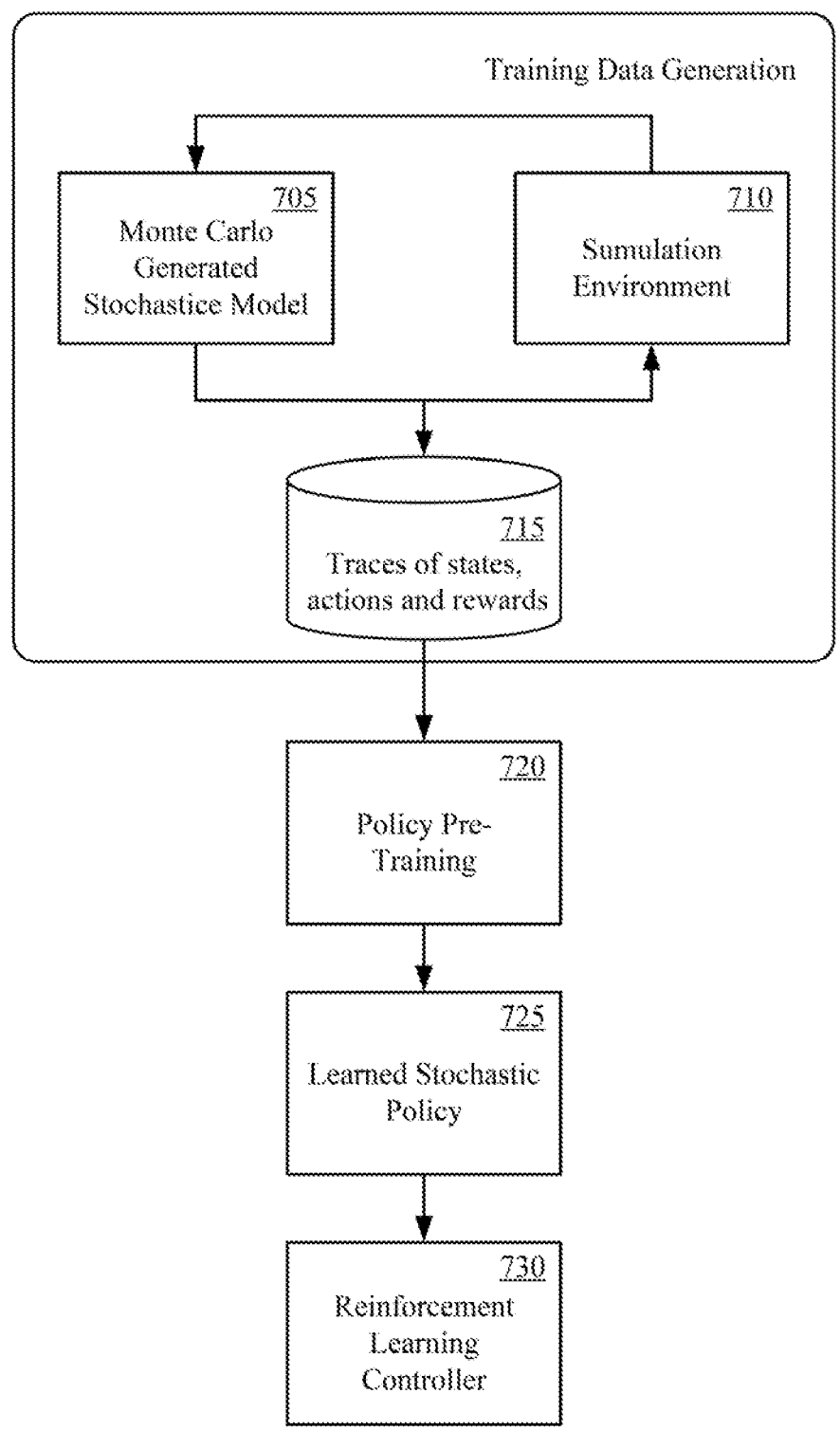
FIG. 7 shows a Monte Carlo base training of a reinforcement leaning controller, in accordance with aspects of the present technology is shown.

Referring now to FIG. 6, a Monte Carlo base training of a reinforcement leaning controller, in accordance with aspects of the present technology is shown. The Monte Carlo based training of a reinforcement learning controller, will be further explained with reference to FIG. 7. The method can include receiving a Monte Carlo generated stochastic control model 705, at 610. The Monte Carlo generated stochastic control model 705 can be a fitted or inferred model. In one implementation, the Monte Carlo generated stochastic control model 705 can be generated as described above with reference to FIG. 5.

At 620, the Monte Carlo generated stochastic control model $\Phi(\tilde{a}|s)$ 705 can be utilized in a simulation environment 710 to generate training data 715. The training data 715 can be generated by capturing traces of states and probabilities of actions $\{s_i, p_\Phi(\tilde{a}_i)\}$. In one implementation, the collected traces of sequences of states and probabilities of actions $\{s_i, p_\Phi(\tilde{a}_i)\}$ can be stored in a data structure for use in the subsequently described pre-training 720-730.

At 630, pre-training 720 can be performed to a stochastic policy using the training data including the collected traces of sequences of states and probabilities of actions $\{s_i, p_\Phi(\tilde{a}_i)\}$. The pre-training 720 can be performed in a supervised learning context. In one implementation, a stochastic policy can be trained such that a distribution of the policy is as close a possible to the Monte Carlo generated stochastic control model $\Phi(\tilde{a}|s)$ 705. The probability of an action $\hat{a}$ given a state s for the stochastic policy can be estimated in accordance with Equation 4.

$$p_{\theta^n}(\hat{a}_i|s_i) = \pi(\hat{a}|s_i, \theta^n) \quad (4)$$

Where the policy $\pi$, parameterized by $\theta$, belongs to a family of distributions $\mathcal{N}$. The closest distribution to $\Phi$, $p_{\theta^\#}$ also in $\mathcal{N}$, parameterized by $\theta^\#$, can be found by minimizing a dissimilarity metric (D), such as cross entropy measurement in accordance with Equation 5.

$$\theta^\# = \min_\theta D_{KL}(p_\Phi(\tilde{a}|s) \,|\, p_{\theta^n}(\hat{a}|s)) \quad (5)$$

where $D_{KL}$ is a Kullbak-Leibler divergence function. Alternatively, the closest distribution can be determined by maximizing a distribution similarity metric.

At 640, a reinforcement learning controller 730 can be trained using the learned stochastic policy 725. The reinforcement learning controller 730 can be trained during a simulation mode or an operating mode of a ground vehicle. The Monte Carlo stochastic control model $\Phi(\tilde{a}|s)$ advantageously provides for pre-training in a high-rewards density thereby reducing the computational workload of training the reinforcement learning controller. By pre-training the reinforcement learning controller in a high-reward density, the search for the optimal policy in reinforcement learning is improved.

The foregoing descriptions of specific embodiments of the present technology have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is intended that the scope of the invention be defined by the claims appended hereto and their equivalents.

What is claimed is:

1. A method comprising:
   receiving a Monte Carlo generated stochastic control model of a set of ground vehicle drivers;
   generating training data by sampling actions for given states of the Monte Carlo generated stochastic control model in a simulated ground vehicle environment and collecting traces of sequences of states, actions and rewards;
   pre-training using the training data including the collected traces of sequences of states, actions, and rewards to learn a stochastic value function for expected discounted future returns; and
   training a reinforcement learning controller using the stochastic value function.

2. The method according to claim 1, wherein the Monte Carlo generated stochastic control model is parameterized by environment states.

3. The method according to claim 1, wherein the generated training data is parametric or non-parametric.

4. The method according to claim 1, wherein the pre-training comprises supervised learning.

5. The method according to claim 1, wherein generation of the stochastic value function includes a regression function to determine an value function Q that minimizes the difference between the determined discounted expected future return R and the predicted discounted expected return $\hat{R}$.

6. The method according to claim 1, wherein the reinforcement learning controller is trained using the value function.

7. The method according to claim 1, wherein Monte Carlo generation of the stochastic control model comprises:
generating, utilizing a Monte Carlo simulation, a set of possible driving scenarios, wherein the scenarios include environment, vehicle slates, controls and related performance metric data;
selected a predetermined subset of driving scenarios from the set of possible driving scenarios; and
fitting a stochastic control model to the selected predetermined subset of driving scenarios.

8. The method according to claim 7, wherein:
the performance metric data comprises fuel efficiency; and
the predetermined subset of driving scenarios is selected based on a predetermined fuel efficiency range.

9. The method according to claim 1, wherein Monte Carlo generation of the stochastic control model comprises:
generating, utilizing a Monte Carlo simulation, a set of possible driving scenarios, wherein the scenarios include environment, vehicle states, controls and related performance metric data;
selected a predetermined subset of driving scenarios from the set of possible driving scenarios; and
inferring a stochastic control model from the selected predetermined subset of driving scenarios.

10. The method according to claim 9, wherein:
the performance metric data comprises fuel efficiency; and
the predetermined subset of driving scenarios is selected based on a predetermined fuel efficiency range.

11. A method comprising:
receiving a stochastic Monte Carlo inferred model of a set of ground vehicle drivers;
generating training data by sampling actions for given states of the stochastic Monte Carlo model in a simulated ground vehicle environment and collecting traces of sequences of states and probabilities of actions;
pre-training using the training data including the collected traces of sequences of states and probability of action to generate a stochastic policy; and
training a reinforcement learning controller using the stochastic policy.

12. The method according to claim 11, wherein the Monte Carlo model is parameterized by environment states.

13. The method according to claim 11, wherein the generated training data is parametric or non-parametric.

14. The method according to claim 11, wherein the pre-training comprises supervised learning.

15. The method according to claim 11, wherein generation of the stochastic policy includes minimizing a distribution dissimilarity metric.

16. The method according to claim 15, wherein the distribution dissimilarity metric comprises a cross entropy measurement.

17. The method according to claim 11, wherein the reinforcement learning controller is trained using the stochastic policy.

18. The method according to claim 11, wherein Monte Carlo generation of the stochastic control model comprises:
generating, utilizing a Monte Carlo simulation, a set of possible driving scenarios, wherein the scenarios include environment, vehicle states, controls and related performance metric data;
selected a predetermined subset of driving scenarios from the set of possible driving scenarios; and
fitting a stochastic control model to the selected predetermined subset of driving scenarios.

19. The method according to claim 18, wherein:
the performance metric data comprises fuel efficiency; and
the predetermined subset of driving scenarios is selected based on a predetermined fuel efficiency range.

20. The method according to claim 11, wherein Monte Carlo generation of the stochastic control model comprises:
generating, utilizing a Monte Carlo simulation, a set of possible driving scenarios, wherein the scenarios include environment, vehicle states, controls and related performance metric data;
selected a predetermined subset of driving scenarios from the set of possible driving scenarios; and
inferring a stochastic control model from the selected predetermined subset of driving scenarios.

21. The method according to claim 20, wherein:
the performance metric data comprises fuel efficiency; and
the predetermined subset of driving scenarios is selected based on a predetermined fuel efficiency range.

* * * * *